United States Patent [19]

Breimer et al.

[11] 3,732,360

[45] May 8, 1973

[54] COLOR TELEVISION SYSTEM HAVING APERTURE CORRECTION

[75] Inventors: Hendrik Breimer; Sing Liong Tan, both of Emmasingel, Eindhoven, Netherlands

[73] Assignee: U.S. Philips Corporation, New York, N.Y.

[22] Filed: Feb. 15, 1972

[21] Appl. No.: 226,432

Related U.S. Application Data

[63] Continuation of Ser. No. 624,944, March 21, 1967, abandoned.

[30] Foreign Application Priority Data

Mar. 26, 1966 Netherlands ........................6604020

[52] U.S. Cl. ..........................178/5.4 R, 178/DIG. 25

[51] Int. Cl. ...............................................H04n 5/14

[58] Field of Search .....................178/5.4 R, 7.1, 7.2, 178/DIG. 25

[56] References Cited

UNITED STATES PATENTS 2,634,324 4/1953 Bedford................................178/5.2

FOREIGN PATENTS OR APPLICATIONS 1,512,352 6/1969 Germany.......................178/DIG. 25

*Primary Examiner*—Robert L. Richardson
*Attorney*—Frank R. Trifari

[57] ABSTRACT

In a color television camera system of the type having camera tubes for the production of red, green and blue color signals, contour signals derived from only one of the color signals are added to all of the color signals.

6 Claims, 2 Drawing Figures

COLOR TELEVISION SYSTEM HAVING APERTURE CORRECTION

CROSS REFERENCE

Figures 1, 2:
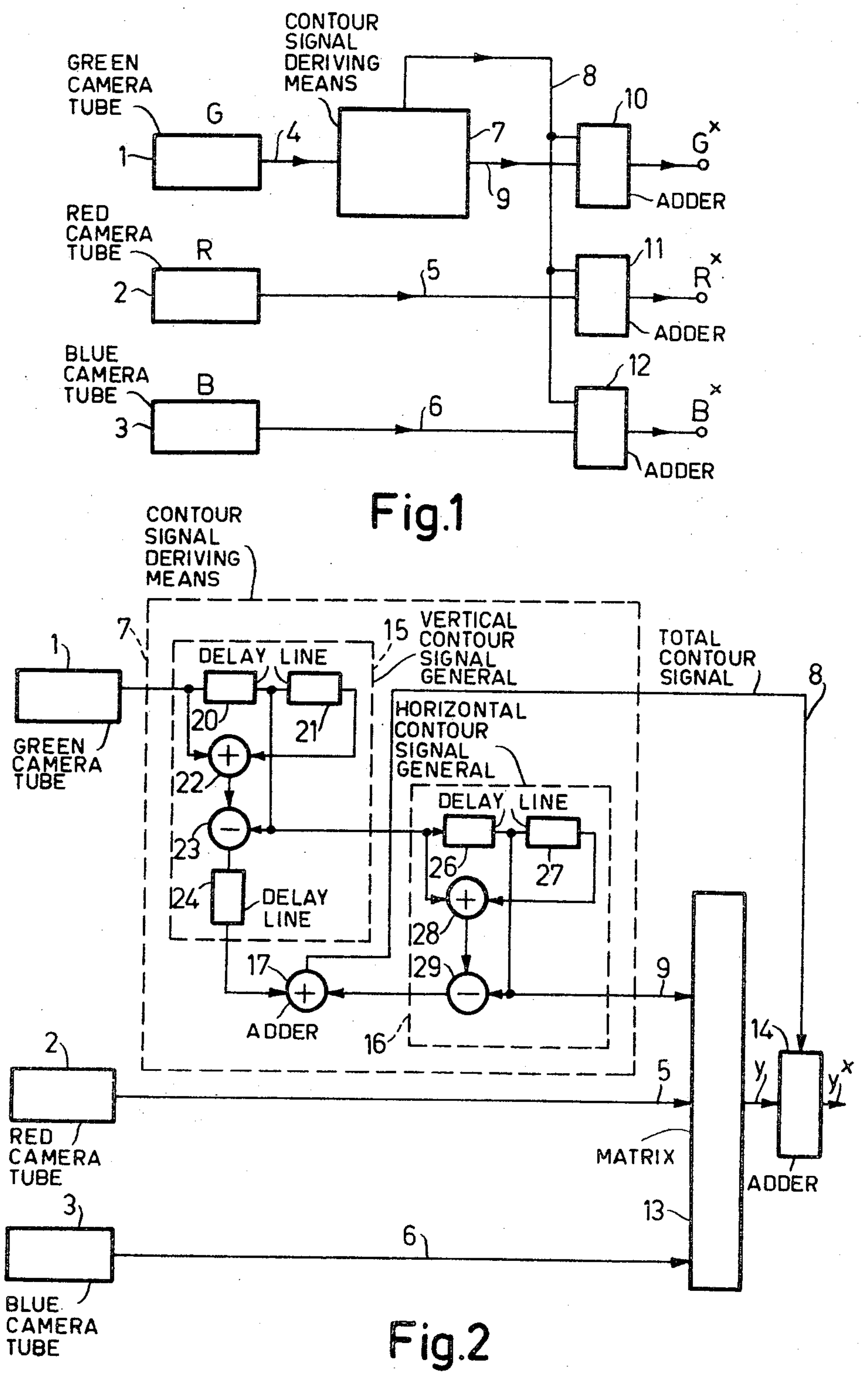

This case is a continuation of application Ser. No. 624,944 filed on Mar. 21, 1967 and now abandoned, the priority of which is hereby claimed.

The invention relates to a color television system comprising a camera having three camera tubes for producing electric signals for the red, blue and green color components respectively, of the image to be taken by the camera. The image reproduced as a potential image on the target plates of the camera tubes is converted by lines and fields into red, green and blue color signals. The system further comprises means for deriving a contour signal by comparing the color signals with each other at more or less adjacent points of the potential image.

In color television systems based on the principle of three primary colors: red, green and blue, the light emanating from the scene to be taken by the camera is split up into the three color components. For each color component a potential image is produced on the target plate of the relevant camera tube. By means of an electron beam from the electron gun of the camera tube the camera tube provides a color signal by scanning this image in lines and fields. The three color signals can then be transmitted in known manner to a color television receiver or monitor, so that the screen of the display tube provides a color picture.

The following errors may appear in the picture on the screen of the display tube:

First, in shadow-mask color television display tubes having three electron guns the color picture is obtained by the superposition of a red, green and blue image on the screen of the display tube. If at the transmitter end coincidence errors appear, they will become manifest in the form of time errors in the three color signals, so that the three images produced by the color signals will not cover each other completely. The display therefore also shows superposition or coincidence errors, which are particularly conspicuous at the transitions (in the color gradations) of the image. These transitions correspond to the high frequencies in the color signals. In order to eliminate the reproduction of the superposition errors on the screen of a display tube, the high frequencies of only one color signal has been transmitted, while they are eliminated from the two other color signals. This may be achieved by suppressing the high frequencies in two color signals by filtering the color signals emanating from the camera, or by causing the relevant camera tubes to provide only the low frequencies of the two color signals.

However, this method does not eliminate the second error, which is faded transitions in the picture on the screen of a display tube. This error is produced by the small, but finite, cross-section of the electron beam produced by the electron gun of the camera tube. The size of the cross-section of the electron beam on the target plate of the camera tube determines the possibility of transferring transition information of the potential image on the target plate to the signal provided by the camera tube. An electron beam of small cross-section will transfer the transition information fairly satisfactorily to the output signal of the camera tube. An electron beam of larger cross-section, which comprises a current related to two adjacent contrast values at the place of the transition in the potential image, provides in a camera output signal which is an average of the contrast values. Therefore, the transition of the image is reproduced in faded fashion on the screen of the display tube. It is obvious that a minimum cross-section of the electron beam on the target plate of the camera tube is desired. However, the minimum cross-section is determined by the maximum current density of the electron beam, which determines the maximum transfer of electric charge. A remedy for the lack of sharpness described is, in general, found in aperture correction by a method also employed in monochrome television. The influence of the size of the cross-section of the electron beam on the reproduction of the transition information of the image in the output signal of the camera tube is corrected by deriving a contour signal from the television signal, said contour signal being subsequently added to the television signal. This method is described inter alia in the article: " A Vertical Aperture Equalizer For Television" in the "-Journal of the SMPTE," June 1960, pages 395 – 401 of W.G. Gibson and A.C. Schroedr. The principle of aperture correction described in this article may be applied to the line scanning (for example in the horizontal direction) or to the field scan (for example in the vertical direction) of the screen of the display tube. The contour signal is obtained by the comparison of the color signals at more or less adjacent points of the potential image by means of delay lines. In order to obtain the contour signal in the line direction the delay time is short, and in a direction at right angles to the former the delay time is usually one line period or, sometimes, about one field priod. By adding the contour signal to the color signal, which would not exhibit sharp transitions in its reproduction on the display screen, an aperture-corrected color signal is obtained. This aperture-corrected color signal provides sharp transitions and even over-compensation; so that the transitions are emphasized. This emphasis may be attributed to the intensity and to the spatial extension of the contour signal on the display screen.

In the color television system based on the principle of three primary colors: red, green and blue, in which a camera having one camera tube for each of the three colors it is known to apply aperture-correction to each of the color signals. If an image reproduced on the display screen exhibits superposition errors, which are particularly conspicuous at the transitions and if aperture-correction is applied to each of the three color signals in the manner described above in order to further define the contrasts, the superposition errors become even more manifest by the aperture correction.

According to the invention an aperture-corrected picture is obtained on the display screen without visible superposition errors by applying only one color signal to said means for obtaining a contour signal, so that a contour signal associated only with this color signal is obtained. This contour signal is added to each of the red, green and blue color signals separately, or to a sum of them by means of a matrix network.

From the foregoing it will be seen that the invention is based on the discovery that not only the superposition errors, but also the fading transitions are visible only in the contours of the displayed pictures. Therefore, an improved result is obtained by leaving the high frequencies as they are (since in this manner the fading transition is not corrected), while only aperture-correction is derived from only one color signal, so that both the superposition error and the fading transition are remedied.

In principle it is not important which color signal is employed for obtaining the contour signal. In practice it is found that the color signal forming the greatest component of the brightness signal composed of the three color signals provides the best results. In systems having a brightness signal $Y=0.30R+0.11B+0.59G$ wherein $R$, $G$ and $B$ designate the red, green and blue color signals respectively, the green color signal is chosen.

The invention will be described more fully by way of example with reference to the following embodiments.

FIG. 1 shows a first embodiment of a color television system according to the invention and FIG. 2 shows a second embodiment.

Referring to FIG. 1, the camera tubes 1, 2 and 3 produce the color signals green $G$, red $R$ and blue $B$ respectively. These color signals are obtained by projecting, in a manner not shown in FIG. 1, the particular color component of the image to be transmitted onto each target plate of the camera tubes 1, 2 and 3, these three target plates being simultaneously scanned by the respective electron beams. The camera tubes 1, 2 and 3 supply the color signals, $G$, $R$ and $B$ to conductors 4, 5 and 6 respectively. In connection with the aforesaid choice of the color signal $G$ for deriving the contour signal, the conductor 4 applies the color signal $G$ to the means 7 for deriving the contour signal. This contour signal is supplied by means 7 to the conductor 8, whereas the conductor 9 conveys the green color signal $G$. Then the contour signal of the green signal $G$ is applied through the conductor 8 and the color signals $G$, $R$ and $B$ are applied through the conductors 9, 5 and 6 respectively to summation devices 10, 11 and 12 and are added therein. From the output of each summation device 10, 11 and 12 there can be derived the aperture-corrected color signals $G^x$, $R^x$ and $B^x$. It will be obvious that this diagram may include further elements such as amplifiers, non-linear parts, filters and, if desired, delay lines and so on. When gamma correction is applied to the color television system, very good results are obtained on the display screen by deriving the contour signal from a non-gamma-corrected color signal and adding it subsequently to the gamma-corrected color signal.

The elements shown in FIGS. 1 and 2 are designated by the same reference numerals. The color signals $G$, $R$ and $B$ are applied through the conductors 9, 5 and 6 respectively to a matrix network 13, in which the brightness signal $Y$ is composed. The contour signal derived by the means 7 from the green color signal $G$ is added through the conductor 8 in the summation device 14 to the brightness signal $Y$. At the output of the summation device 14 appears the aperture-corrected brightness signal $Y^x$.

The means 7 for deriving the contour signal are shown in detail in FIG. 2. By means of storage tubes an integral aperture correction may be obtained in the line direction and in the direction at right angles thereto. If delay lines with separate aperture correction of the vertical and horizontal directions are used, a diagram as shown with the contour signal deriving means 7 in FIG. 2 is employed. The contour signal in the vertical direction is provided by a means 15, while a means 16 is used to generate a contour signal in the horizontal direction, so that through the summation device 17 the total contour signal is applied to the conductor 8 and hence, to the luminance signal by adder 14.

In detail, the vertical contour signal generator comprises delay lines 20 and 21 each having a delay of about one line period, i.e., 64 microseconds. The undelayed and twice delayed signals are added together by adder 22 and the resultant sum subtracted in subtractor 23 from the once delayed signal. The result is a vertical contour correction signal that is delayed by about 100 nanoseconds in delay line 24, and then applied to one input of adder 17.

Similarly, the once delayed signal from vertical generator 15 is twice delayed by about 100 nanoseconds each time by delay lines 26 and 27 in horizontal contour signal generator 16. The undelayed and twice delayed signals are added in adder 28 and then subtracted from the once delayed signal in subtractor 29. The resultant horizontal contour correction signal is then applied to adder 17, the output of which is said total contour signal. A delayed green signal is applied through conductor 9 to said matrix 13.

It will be obvious that aperture correction may also be used in one direction within the scope of the invention.

The color signals $G$ through the conductor 9 will have a time delay, because of delay lines 20 and 26 with respect to the color signals $R$ and $B$ through the conductors 5 and 6. By means of a delay line in each of the conductors 5 and 6 the short difference in time in the horizontal direction and the time difference, for example, one line period, in the vertical direction may be eliminated, since this delay becomes manifest on the display screen in a shift of the green field with respect to the red and blue fields. By using interlacing in composing the picture on the display screen, this shift at right angles to the horizontal direction is distinctly visible. The shift of the fields may be obviated in a simple manner by shifting the scan of the target plate by the electron beam in the green camera tube 1 with respect to the scans in the red and blue camera tubes 2 and 3 respectively. With interlacing this means that in the vertical direction, the electron beam of the green camera tube 1, scans the line $(n+2)$ at the instant when in the red and blue camera tubes 2 and 3 in the line $n$ is scanned. Moreover, the delay in the horizontal direction can be corrected by a similar small shift in the horizontal direction over at least one image point.

As stated above, the contour signal is derived from the green color signal only by way of example, since this signal provides the greatest contribution to the brightness signal. The principle of the invention with its advantages may be applied, though with less effective results, when the contour signal is derived from the red or the blue color signal.

What is claimed is:

1. A color television system comprising means for producing potential images corresponding to each of three color components of an optical image and converting said potential images into color component signals, means to derive a delayed signal from one of said color component signals by comparing the color component signals with each other at substantially adjacent points of the potential image to thereby obtain a contour signal associated with said color component signal, and adding said delayed signal to all said color component signals to sharpen transitions therein.

2. A color television system as claimed in claim 1 wherein said three color signals comprise red, blue, and green signals respectively and the delayed signal is derived from the gree color signal.

3. A color television system as claimed in claim 1 wherein said output signal comprises separate color signals and the delayed signal is added to the individual color signals.

4. A color television system as claimed in claim 1 wherein said adding means adds said color signals to form said output signal and the delayed signal is added to the output signal comprising the sum of the color signals.

5. A color television system as claimed in claim 1 wherein said means for deriving a delayed comprises means for deriving both a horizontal and a vertical aperture correction signal.

6. A device as claimed in claim 5 wherein said delay means and further comprises means for obviating said delay including means for shifting the scan of the signal source from which the delay signal is derived with respect to the scan of the remaining signal sources.

* * * * *

UNITED STATES PATENT OFFICE

CERTIFICATE OF CORRECTION

Patent No. 3,732,360 Dated May 8, 1973

Inventor(s) HENDRIK BREIMER ET AL E

It is certified that error appears in the above-identified patent and that said Letters Patent are hereby corrected as shown below:

Column 5, line 7, after "signal, and" insert --means for--; after "all" insert --of--.

Column 5, line 12, change "gree" to read --green--.

Column 5, line 14, delete "said" and insert --an--.

Column 6, line 3, delete "said" and insert --an--.

Column 6, line 7, after "delayed" insert --signal--.

Column 6, line 11, delete "and".

Signed and sealed this 23rd day of July 1974.

(SEAL)
Attest:

McCOY M. GIBSON, JR.
Attesting Officer

C. MARSHALL DANN
Commissioner of Patents

PO-1050
(5/69)

UNITED STATES PATENT OFFICE
CERTIFICATE OF CORRECTION

Patent No. 3,732,360 Dated May 8, 1973

Inventor(s) HENDRIK BREIMER ET AL

It is certified that error appears in the above-identified patent and that said Letters Patent are hereby corrected as shown below:

Col. 1, line 16, after "comparing" insert -- one of --;

line 17, delete "each other" and insert -- itself --;

Col. 5, line 4, change "signals" to -- signal --; delete "each other" and insert -- itself --;

Signed and sealed this 5th day of November 1974.

(SEAL)
Attest:

McCOY M. GIBSON JR.
Attesting Officer

C. MARSHALL DANN
Commissioner of Patents